United States Patent
Millet et al.

(10) Patent No.: US 7,739,359 B1
(45) Date of Patent: Jun. 15, 2010

(54) METHODS AND APPARATUS FOR SECURE CABLE MODEM PROVISIONING

(75) Inventors: Mark Millet, Mountain View, CA (US); Raman Krishnan, San Jose, CA (US); Tin Phan, San Ramon, CA (US); Chrisanto de Jesus Leano, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1362 days.

(21) Appl. No.: 10/242,375

(22) Filed: Sep. 12, 2002

(51) Int. Cl.
    *G06F 15/177* (2006.01)
(52) U.S. Cl. .................. 709/220; 709/221; 709/225; 709/226; 709/228; 709/229; 725/111; 725/119
(58) Field of Classification Search .......... 709/220, 709/221, 225, 226, 228, 229; 725/111, 119
    See application file for complete search history.

(56) References Cited

U.S. PATENT DOCUMENTS

| | | | | |
|---|---|---|---|---|
| 6,012,088 A * | 1/2000 | Li et al. | ........... | 709/219 |
| 6,049,826 A * | 4/2000 | Beser | ........... | 709/222 |
| 6,189,102 B1 * | 2/2001 | Beser | ........... | 726/2 |
| 6,247,054 B1 * | 6/2001 | Malkin | ........... | 709/225 |
| 6,289,377 B1 * | 9/2001 | Lalwaney et al. | ........... | 709/222 |
| 6,466,986 B1 * | 10/2002 | Sawyer et al. | ........... | 709/245 |
| 6,615,257 B2 * | 9/2003 | Lee et al. | ........... | 709/222 |
| 6,636,894 B1 * | 10/2003 | Short et al. | ........... | 709/225 |
| 6,687,733 B2 * | 2/2004 | Manukyan | ........... | 709/200 |
| 6,715,075 B1 * | 3/2004 | Loukianov | ........... | 713/176 |
| 6,728,232 B2 * | 4/2004 | Hasty et al. | ........... | 370/338 |
| 6,742,187 B1 * | 5/2004 | Vogel | ........... | 725/126 |
| 6,766,364 B2 * | 7/2004 | Moyer et al. | ........... | 709/221 |
| 6,813,670 B1 * | 11/2004 | Yao et al. | ........... | 710/302 |
| 6,865,192 B1 * | 3/2005 | Barrow | ........... | 370/475 |
| 6,917,628 B2 * | 7/2005 | McKinnin et al. | ........... | 370/468 |
| 6,938,079 B1 * | 8/2005 | Anderson et al. | ........... | 709/222 |
| 6,947,980 B1 * | 9/2005 | Knudsen et al. | ........... | 709/223 |
| 6,986,157 B1 * | 1/2006 | Fijolek et al. | ........... | 725/111 |
| 7,012,891 B1 * | 3/2006 | Chandran et al. | ........... | 370/230 |
| 7,024,484 B2 * | 4/2006 | Alexis | ........... | 709/229 |
| 7,065,047 B2 * | 6/2006 | Boxall et al. | ........... | 370/230 |
| 7,139,818 B1 * | 11/2006 | Kinnear et al. | ........... | 709/222 |
| 7,165,116 B2 * | 1/2007 | Grove et al. | ........... | 709/245 |
| 7,388,884 B2 * | 6/2008 | Bunn et al. | ........... | 370/474 |

OTHER PUBLICATIONS

"Cable Access: Provisioning Server," FB190-2689EC-B, Bay Networks, Inc., © Jun. 1997.
"DOCSIS Provisioning System," Promptlink Communications, © 2002-2003, pp. 1-3. [see www.promptlink.com].

* cited by examiner

*Primary Examiner*—Kevin Bates
*Assistant Examiner*—Van Kim T Nguyen
(74) *Attorney, Agent, or Firm*—Weaver Austin Villeneuve & Sampson LLP

(57) ABSTRACT

Methods and apparatus are provided for enhancing security and features during cable modem configuration. According to various embodiments, a cable network head end is configured to ensure that a cable modem subscriber registers with its assigned configuration profile. Techniques for verifying parameters in a received configuration profile, enhancing authentication, preventing access to provisioning servers, securing communications, and enhancing feature sets are provided.

10 Claims, 9 Drawing Sheets

Figure 6

Configuration Profile 601
Quality Of Service Information 611
- Max Rate 613a
- Min Rate 613b
- Guaranteed Rate 615
- Number Of IP Addresses 617
- Signalling Priorities Allowed 619

Upstream/Downstream Frequencies 631
Cable Modem IP Address 633
Access Enable/Disable 635
Image Upgrade Filename 637
SNMP Settings 639
Timestamp 641

METHODS AND APPARATUS FOR SECURE CABLE MODEM PROVISIONING

BACKGROUND OF THE INVENTION

1. Field of Invention

The present invention relates generally to configuring a cable modem. More particularly, the present invention relates to providing security and feature enhancements at a cable network head end for more effectively configuring a cable modem in a cable network.

2. Description of the Related Art

Conventional cable modems are initialized in a cable network after communicating with a cable network head end as well as other address, provisioning, and configuration servers. However, conventional initialization and provisioning sequences for cable modems include limited functionality for a head end as well as limited security. The limited security in the cable modem initialization sequence has prompted opportunistic subscribers to configure cable modems with configuration profiles not assigned to the particular cable modems. In one example, opportunistic subscribers initialize cable modems with quality of service profiles that allow higher bandwidth usage than the quality of service profile assigned.

Because security during cable modem initialization is limited, subscribers have been able to configure cable modems with different configuration profiles while remaining undetected in many instances.

Consequently, it is desirable to provide improved techniques for secure cable modem initialization and/or configuration in a cable network while allowing an enhanced feature and capability set for a cable network head end.

SUMMARY OF THE INVENTION

Methods and apparatus are provided for enhancing security and improving cable network head end features during cable modem configuration. According to various embodiments, a cable network head end is configured to ensure that a cable modem subscriber registers with its assigned configuration profile. Techniques for verifying parameters in a received configuration profile, enhancing authentication, preventing access to provisioning servers, securing communications, and modifying messages between a configuration server and a cable modem are provided.

In one embodiment, a method for configuring a cable modem is provided. A configuration server address request is received from a cable modem. The configuration server address request is forwarded from the cable modem to an address server. A configuration server address offer is received from the address server. The configuration server address offer includes the address of a configuration server. The address of the configuration server is replaced with the address of the head end. The modified configuration server address offer is forwarded to the cable modem. The modified configuration server address offer configures the cable modem to send a quality of service profile request to the head end instead of to the configuration server.

In another embodiment, a cable modem head end is provided. The cable modem head end includes a first interface, a second interface, and a processor. The first interface is coupled to a plurality of cable modems and is configured to receive a configuration server address request from a cable modem. The second interface is coupled to an address server and is configured to forward the configuration server address request from the cable modem to the address server and receive a configuration server address offer from the address server. The configuration server address offer includes the address of a configuration server. A processor is configured to replace the address of the configuration server with the address of the head end. The first interface is further configured to forward the modified configuration server address offer to the cable modem. The modified configuration server address offer configures the cable modem to send a quality of service profile request to the head end instead of to the configuration server.

In another embodiment, a method for configuring a cable modem is provided. A configuration profile request is received from a cable modem. A configuration profile reply is sent to the cable modem. The configuration profile reply includes a first configuration profile including quality of service information. A configuration registration request is received from the cable modem. The configuration registration request includes a second configuration profile including a quality of service information. The second configuration profile included in the configuration registration request from the cable modem is verified to ensure that it corresponds to the first configuration profile in the configuration profile reply sent to the cable modem.

Other embodiments of the invention pertain to computer program products including machine readable mediums on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 6 is a diagrammatic representation showing some examples of configuration profile parameters.

DETAILED DESCRIPTION OF SPECIFIC EMBODIMENTS

The present invention relates to configuring a cable modem in a cable network. More specifically, the present invention relates to methods and apparatus for effectively and accurately configuring a cable modem coupled to a cable network head end.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of a cable modems in a cable network. However, it should be noted that the techniques of the present invention are applicable to a variety of different protocols and networks. Further, the solutions afforded by the invention are equally applicable to variations in cable networks. In one example, the techniques apply to networks that have subscribers register a configuration profile with a head end after the subscriber obtains the configuration profile from a third entity. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
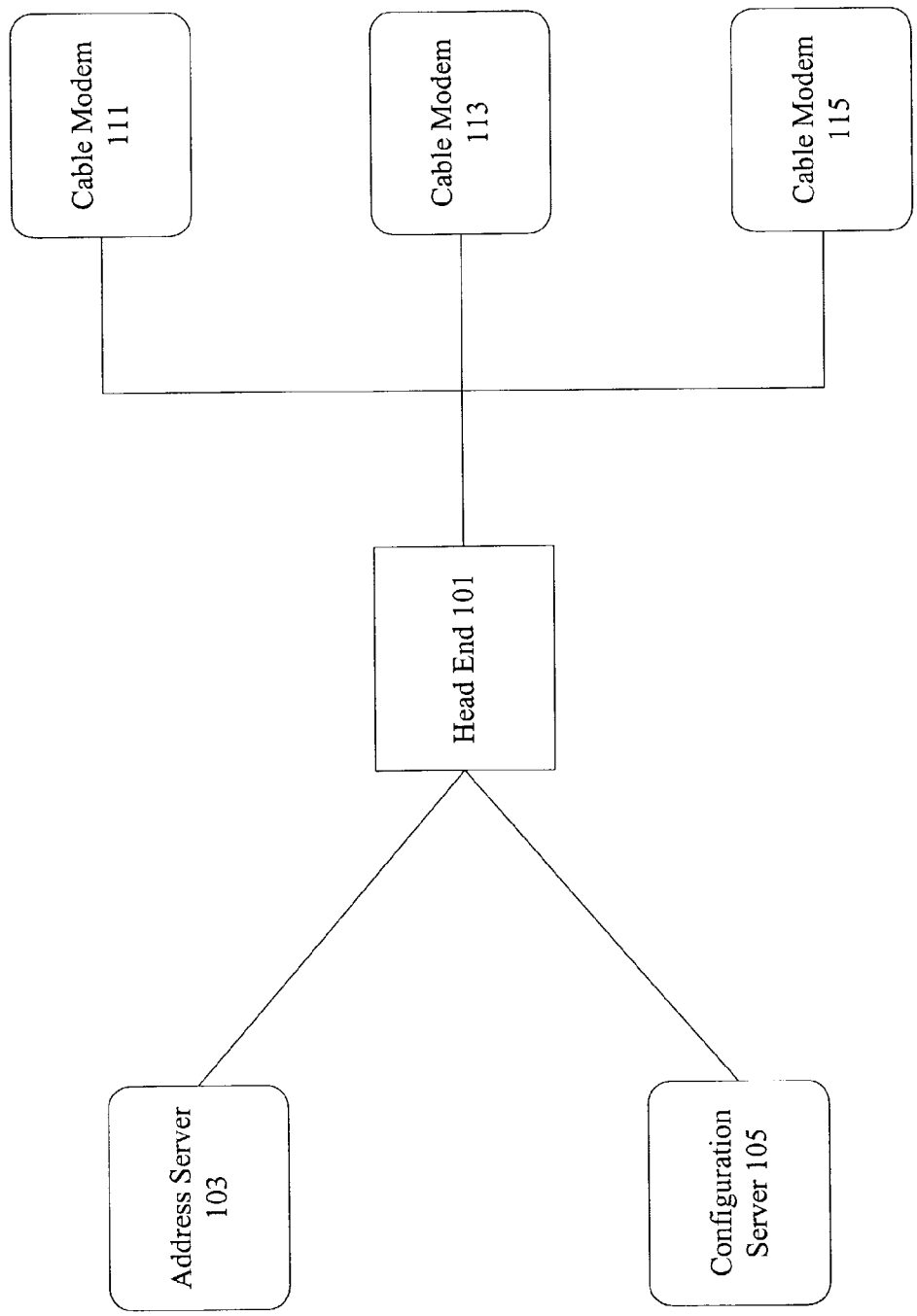
FIG. 1 is a diagrammatic representation of a system that can use the techniques of the present invention.

FIG. 1 is a diagrammatic representation of one example of a system that can use the techniques of the present invention. A cable network includes a cable network head end 101 that provides a communication interface between cable modems 111, 113, and 115 in the cable network and external nodes. The cable modems 111, 113, and 115 typically reside at subscriber premises. In order to operate properly, a cable modem operating system uses information such as upstream and downstream frequencies, guaranteed rates, and signaling parameters to configure the cable modem in the network. In typical implementations, each cable modem acquires a configuration profile from a configuration server 105. In one example, the configuration file is a DOCSIS configuration file. To access the configuration file, each cable modem acquires an address for a configuration server 105 from an address server 103 during initialization. In some implementations, the address server 103 is a Dynamic Host Configuration Protocol (DHCP) server. Any mechanism or entity configured to provide information relating to the whereabouts of a configuration profile for a particular subscriber is referred to herein as an address server DHCP servers are conventionally used to automatically assign IP addresses, to deliver TCP/IP stack configuration parameters such as the subnet mask and default router, and to provide other configuration information such as the addresses for printer, time and news servers. The configuration server 105 is typically Trivial File Transfer Protocol (TFTP) server. It should be noted that in some cable networks, the address server 103 and the configuration server 105 are the same server. Any mechanism or entity configured to provide a configuration profile to a particular subscriber is referred to herein as a configuration server.

The cable modem is configured to communicate with the configuration server 105 and the address server 103 through cable network head end 101. Each cable network head end 101 is typically connected to the cable modems 111, 113, and 115 through a variety of other devices (not shown). In one example, the head end 101 is connected to the cable modems through one or more hubs. Each hub is operable to service one or more fiber nodes in the cable network. Each fiber node is, in turn, configured to service multiple cable modems. A primary function of the fiber nodes is to provide an optical-electronic signal interface between the cable network head end 101 and the plurality of cable modems 111, 113, and 115.

Communication between the cable network head end 101 and fiber nodes is typically implemented using modulated optical signals that travel over fiber optic cables. More specifically, during the transmission of modulated optical signals, multiple optical frequencies are modulated with data and transmitted over optical fibers such as, for example, optical fiber links and are typically referred to as "RF fibers".

The modulated optical signals transmitted from the cable network head end 101 eventually terminate at the fiber node. The fiber nodes maintain the RF modulation during conversion between fiber and coax media.

In typical applications, a cable modem 111 requests the address of a configuration server 105 from an address server 103. In some instances, the address server 103 is also the configuration server 105, in which case, the address server 103 will provide its own IP address. After the address of the configuration server 105 is provided, cable modem 111 communicates with the configuration server 105 to obtain for a configuration profile. Typically, the configuration profile includes information for setting upstream and downstream frequencies, the quality of service profile, and other cable modem initialization parameters. A configuration server 105 typically includes a set of configuration profiles. The configuration profile is provided to cable modem 111 with relatively little security.

In one implementation, the configuration profile is provided with a simple digital signature, such as an MD5 hash. The cable modem 111 then provides a registration message to the head end 101 with the configuration profile provided by the configuration server 105. The head end 101 verifies that the digital signature is a valid digital signature in the set of valid digital signatures. However, the head end 101 merely verifies that the digital signature is a valid digital signature in the global set of valid signatures. The head end 101 does not verify that the configuration profile provided by the cable modem 111 is the correct configuration profile assigned to cable modem 111. An opportunistic subscriber could program the cable modem with one of many valid configuration profiles associated with one of many valid digital signatures.

In one example, an opportunistic subscriber could program the cable modem with a profile having a higher level of service than the one assigned to the subscriber. The cable modem 111 would then register with the profile having a higher level of service. The head end 101 merely verifies that the digital signature associated with the profile is one in the set of the valid digital signatures. The head end 101 does not verify if the profile matches the profile assigned to cable modem 111. Consequently, as long as a subscriber could obtain a valid profile along with the associated digital signature in the set of valid profiles and associated digital signatures recognized by the head end 101, the subscriber can register a cable modem 111 with a different profile than one assigned.

The techniques of the present invention provide mechanisms for enhancing the security as well as the functionality of a head end 101. The mechanisms provide security against opportunistic subscribers seeking to register or cable modems with profiles that do not match their assigned profiles. In one example, the mechanisms prevent an opportunistic subscriber from setting higher guaranteed rates for a particular cable modem. Using the mechanisms of the present invention also allow a head end 101 to implement other features such as more efficient load balancing and dynamic updates of cable modem flash memory.

Figure 2:
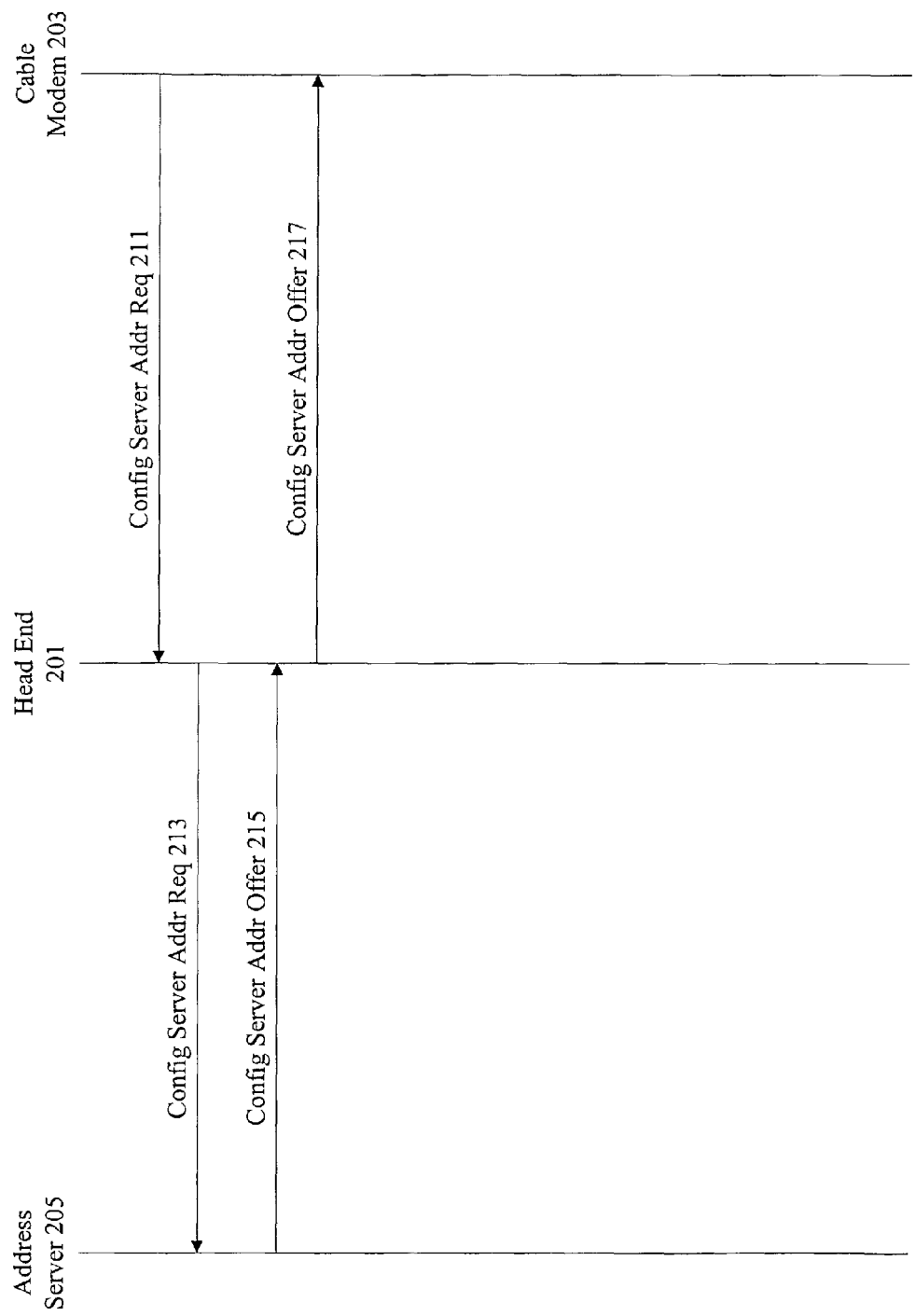
FIG. 2 is a diagrammatic representation of an exchange between a cable modem, a cable network head end, and an address server.

FIG. 2 is a transaction diagram showing a cable modem 203 communicating with an address server 205 through a head end 201 in typical initialization sequences. The cable modem 203 sends a configuration server address request 211 to a head end 201 that relays the configuration server address request message 213 to an address server 205. Any message from a subscriber requesting the location of a configuration file is referred to herein as a configuration server address request message. In one example, the configuration server address request message is a DHCP request to an address server 205 for the address of a configuration server as well as the name of a configuration file.

The address server 205 sends a configuration server address offer 215 to the head end 201. Any entity or mechanism providing service to multiple subscribers using information and parameters such as quality of service parameters provisioned by a third party is referred to herein as a head end 201. A head end 201 relays the configuration server address offer 215 to the cable modem 203. It should be noted that the head end 201 does not perform any processing. Instead, the head end 201 merely relays the messages between the cable modem 203 and the address server 205.

Figure 3:
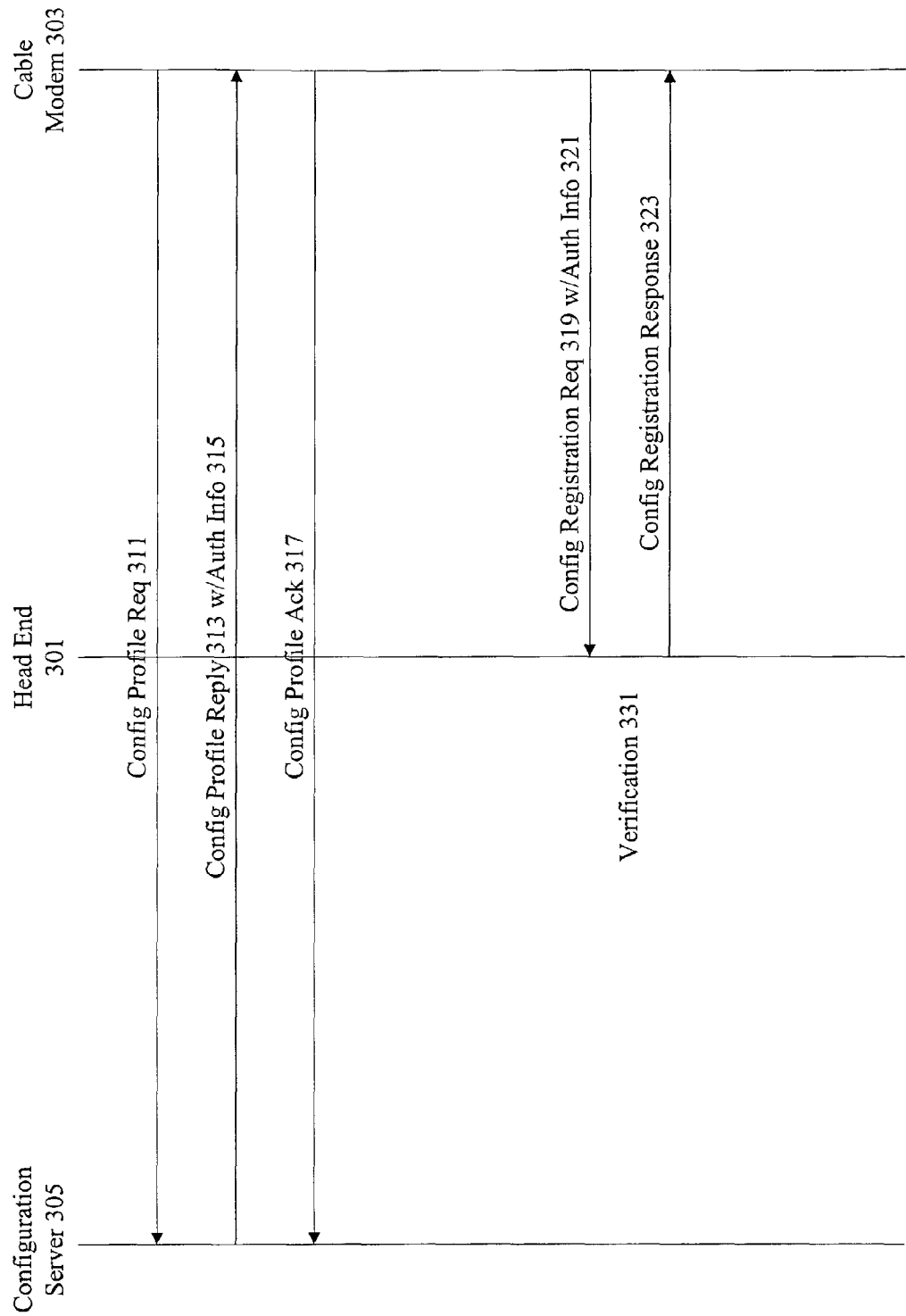
FIG. 3 is a diagrammatic representation of an exchange between a cable modem, a cable network head end, and a configuration server.

FIG. 3 is a transaction diagram showing cable modem and configuration server interaction after an address server provides the location and name of a configuration file. The cable modem 303 sends a configuration profile requests 311 to the configuration server 305. According to various embodiments, the configuration profile request 311 is a TFTP request sent to a TFTP server. Any message sent from a subscriber requesting a configuration profile is referred to herein as a configuration profile request. The configuration server 305 identifies the particular cable modem 303 and provides the configuration profile assigned to the particular cable modem 303. In one example, if the cable modem 303 is a standard subscription user, the configuration server 305 provides a standard profile to the subscriber. The configuration server verifies sends a configuration profile reply 313 with authentication information 315 associated with the configuration profile.

In one example, the configuration server 305 has 15 different profiles for the thousands of cable modems in a cable network. An individual cable modem is assigned one of the 15 different profiles. The 15 different profiles may have different levels of service, assigned ports, upstream and downstream frequencies, etc. Each of the 15 different profiles has authentication information corresponding to the profile. For example, one particular profile may have an MD5 hash value associated with the profile. After the cable modem receives the configuration profile, it sends a configuration profile acknowledgment 317 and registers a configuration profile with the head end 301. The head end 301 checks to ensure that the authentication information is valid. In other words, the head end 301 checks to ensure that the authentication information matches one of the 15 different authentication values available. An opportunistic subscriber could program a cable modem 303 with a configuration profile superior to the one that it was assigned.

In one example, an opportunistic subscriber could substitute a configuration profile with a standard quality of service level with a configuration profile that has a higher quality of service level. As long as the configuration profile is one of the 15 valid profiles in the cable network, the head end 301 would accept the configuration profile. More specifically, cable modem 303 would send a configuration registration requests 319 with authentication information 321 to head end 301. Any message sent by a cable modem to register a configuration profile with a head end is referred to herein as a configuration registration request. To perform verification 331, the head end 301 would compare the authentication information 321 from the cable modem 303 to a set of authentication values valid in the cable network. If the authentication information 321 is valid, the head end 301 sends a configuration registration response 323 to cable modem 303. Otherwise, the cable modem typically restarts the configuration sequence and acquire another configuration profile from the configuration server 305.

Figure 4:
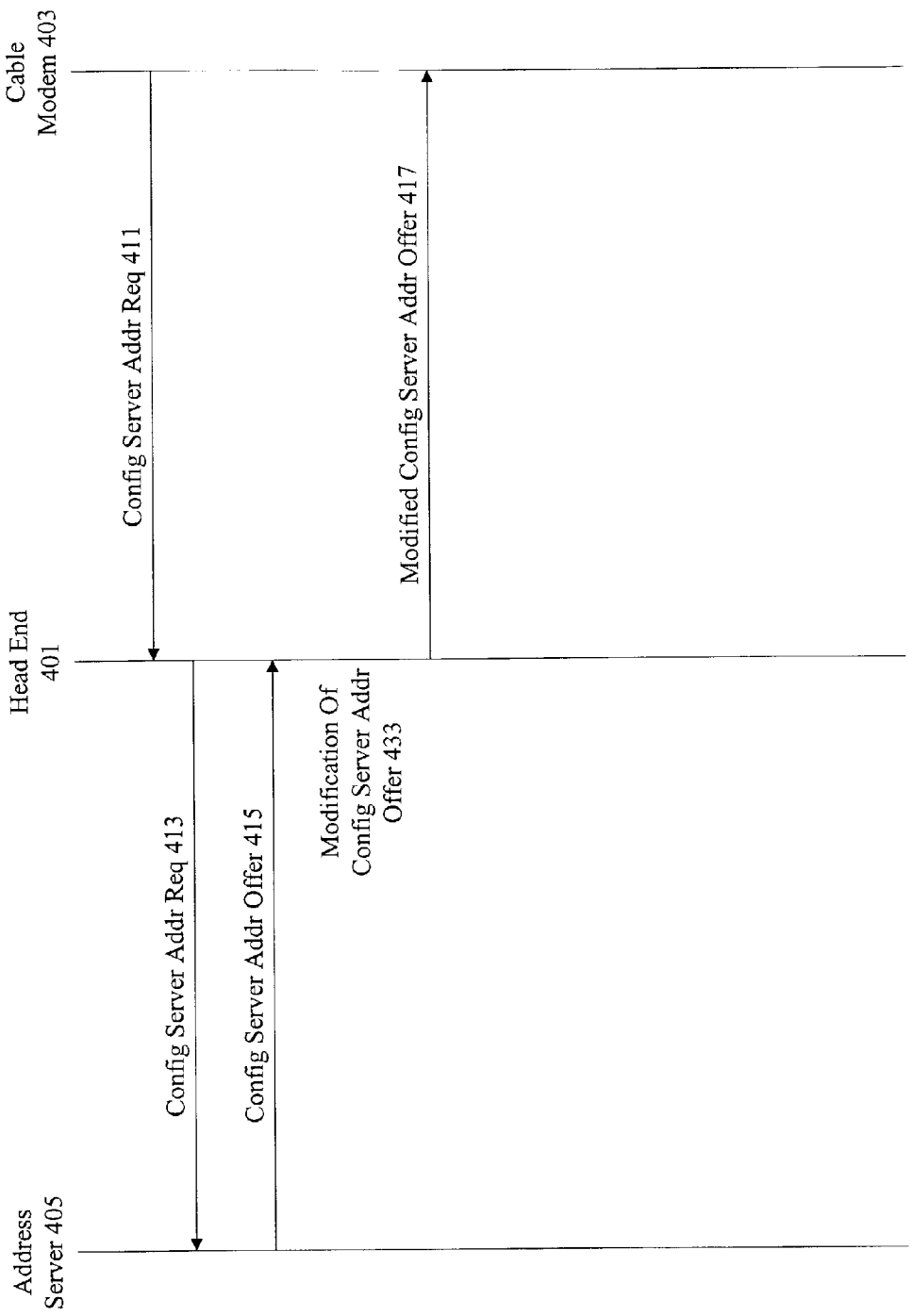
FIG. 4 is a diagrammatic representation of a modified exchange between a cable modem, a cable network head end, and an address server.

FIG. 4 is a transaction diagram showing a cable modem 403 communicating with an address server 405 through a head end 401 according to various embodiments. The cable modem 403 sends a configuration server address request 411 to a head end 401 that relays the configuration server address request message 413 to an address server 405. As noted above, the configuration server address request message may be a DHCP request to an address server 405 for the address of a configuration server as well as the name of a configuration file. The address server 405 sends a configuration server address offer 415 to the head end 401. Instead of simply relaying the configuration server address offer 215 to the cable modem 403, one security enhancement of the present invention provides that the head end 401 modify the configuration server address offer 415 with new information such as a new configuration server address and a new configuration file name.

The head end 401 sends the modified configuration server address offer 417 to the cable modem 403. In one embodiment, the configuration server address is replaced with the address of the head end 401 so that the head end 401 can effectively provide a configuration profile to the cable modem 403. A subscriber is prevented from communicating with a configuration server and is prevented from obtaining other configuration profiles along with their associated hash sequences. According to various embodiments, the name of the configuration file is also changed to make it even more difficult to obtain configuration profiles.

Figure 5:
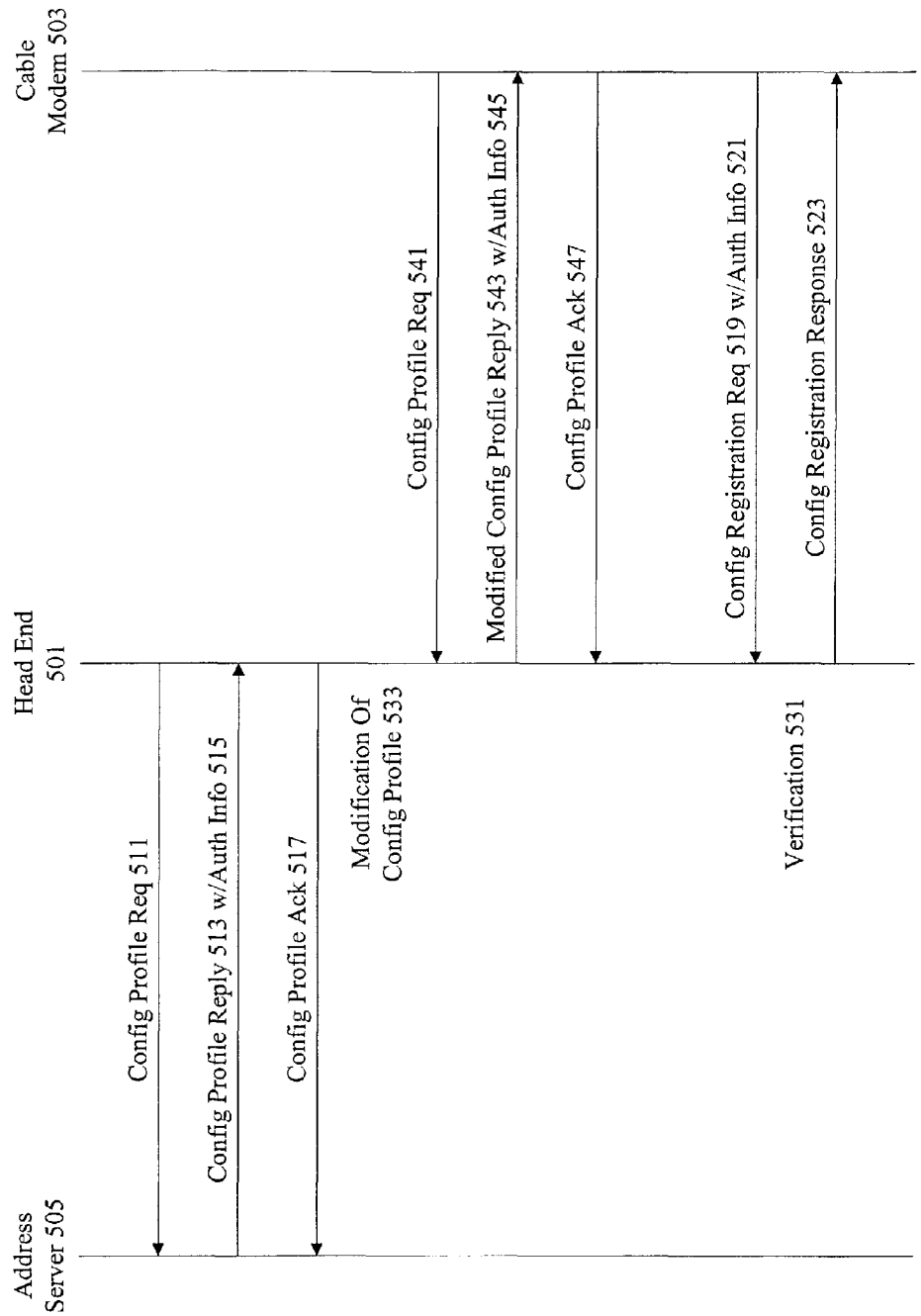
FIG. 5 is a diagrammatic representation of a modified exchange between a cable modem, a cable network head end, and a configuration server.

FIG. 5 is a transaction diagram showing one example of cable modem and cable network head end interaction after a head end provides its own address as the location of the address server. The head end 501 sends a configuration profile request 511 to the configuration server 505 on behalf of the cable modem 503. It should be noted that this message may be sent at any time in relation to the configuration profile request 541 received from the cable modem 503. According to various embodiments, the configuration profile request 511 is a TFTP request sent to a DHCP server. The configuration server 505 identifies the particular cable modem 503 believed associated with the request and provides a configuration profile assigned to the particular cable modem 503. That is, the configuration server 505 believes that it is communicating with a cable modem and not a head end. The head end 501 verifies that the configuration profile and associated hash is a valid one for the cable network. In one example, the head end 501 verifies that the profile is one of 5 different valid profiles associated with 5 different hash sequences.

According to various embodiments, the head end 501 modifies the configuration profile and/or replaces the authentication information 515 with authentication information to the cable modem 503. In one example, if the cable modem 503 is a standard subscription user, the configuration server 505 provides a standard profile to the subscriber with one or more parameters modified so that when a cable modem 503 later registers with a configuration profile, the head end 501 can verify that the one or more modified parameters are included.

More specifically, the head end receives a configuration profile request 541 from the cable modem 503. The head end 501 provides the modified configuration profile in a modified configuration profile reply 543 with modified authentication information 545 to the cable modem 503, which believes that it is communicating with a configuration server. The cable modem 503 then sends a configuration profile acknowledgement 547 to the head end 501. In some implementations, the head end 501 verifies that the acknowledgement is received to ensure that the cable modem 503 is operating under normal parameters.

The cable modem 503 then sends a configuration registration request 519 with authentication information 521 to head end 501. It should be noted that authentication information does not necessarily have to be sent. To perform verification 531, the head end 301 compares the configuration profile sent in the modified configuration profile reply 543 with the configuration profile in the configuration registration request 519 sent by the cable modem. If the one or more parameters designated for comparison match, the cable modem is valid. Otherwise, the cable modem has to restart the configuration sequence and acquire another configuration profile from the configuration server 505. However, to further enhance security, the cable modem can be locked into a predetermined configuration profile if the cable modem is determined to be invalid. Furthermore, the cable modem can be flagged to a allow a system administrator at the head end 501 to identify the opportunistic subscriber. In one example, the cable modem is locked into a configuration profile with a low quality of service.

It should be noted that a variety of enhancements have been provided during a cable modem configuration sequence. Any one of the enhancements would provide improved cable network security. Implementing multiple enhancements further prevents cable modem misuse. For example, in one example, a configuration profile and authentication information are not modified. Instead, the configuration profile received during a cable modem registration request 519 is compared with the configuration profile provided in a configuration profile reply 543. In another example, the configuration profile is not compared and instead the authentication information is compared. In still other examples, nothing is compared and instead the head end simply modifies the name and location of the configuration file.

FIG. 6 is a diagrammatic representation of an exemplary configuration profile provided to a particular cable modem. A configuration profile 601 typically includes quality of service information 611 as well as other parameters. According to various embodiments, quality of service information 611 includes a maximum rate 613a, a minimum rate 613b, a guaranteed rate 615, signaling priorities allowed 619, as well as the number of IP addresses 617 assigned to the subscriber. It should be noted that other parameters may be included in quality of service information 611 and some parameters in quality of service information 611 may be included as other parameters. The configuration profile 601 can also include upstream and downstream frequency information 631, the cable modem IP address 633, access enable and disable parameters six under 35, a flash upgrade filename 637, SNMP settings 639, and a timestamp 641. Any of the these parameters as well as other parameters can be compared to verify that a cable modem is registering with the assigned configuration profile. In one example, minimum rates and maximum rates in the configuration profile provided to the cable modem are compared against minimum rates and maximum rates provided by the cable modem during registration with the head end.

Figure 7:
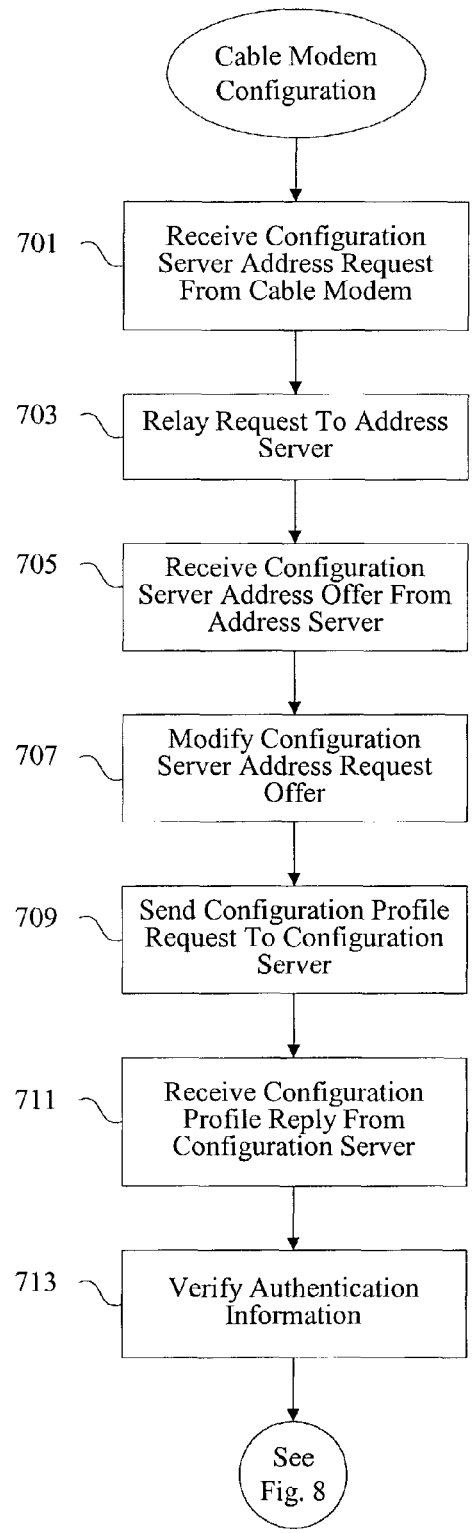
FIG. 7 is a process flow diagram showing operations at a head end.

FIG. 7 is a flow process diagram showing one example of cable modem configuration. At 701, a head end receives a configuration server address request from a cable modem. At 703, the head end relays the request to an address server. At 705, the head end receives a configuration server address offer from the address server. The configuration server address offer typically includes the IP address of a TFTP server as well as the name of a configuration file. At 707, the head end modifies the configuration server address request offer and forwards it to the cable modem. In one example, the head end modifies the IP address and replaces the IP address of the TFTP server with the IP address of itself. The name of the configuration file can also be changed. At 709, the head end sends a configuration profile request to the configuration server on behalf of a cable modem. It should be noted, at this point the head end is mimicking a cable modem. The configuration server believes that the configuration profile request is from a cable modem and sends a configuration profile to the head end. At 711, the head end receives the configuration profile reply from the configuration server. At 713 head end can optionally verify that the authentication information associated with the configuration profile is valid. It should be noted that that any point after the modified configuration server address offer is provided to the cable modem, the head end may receive a configuration profile request from the cable modem.

Figure 8:
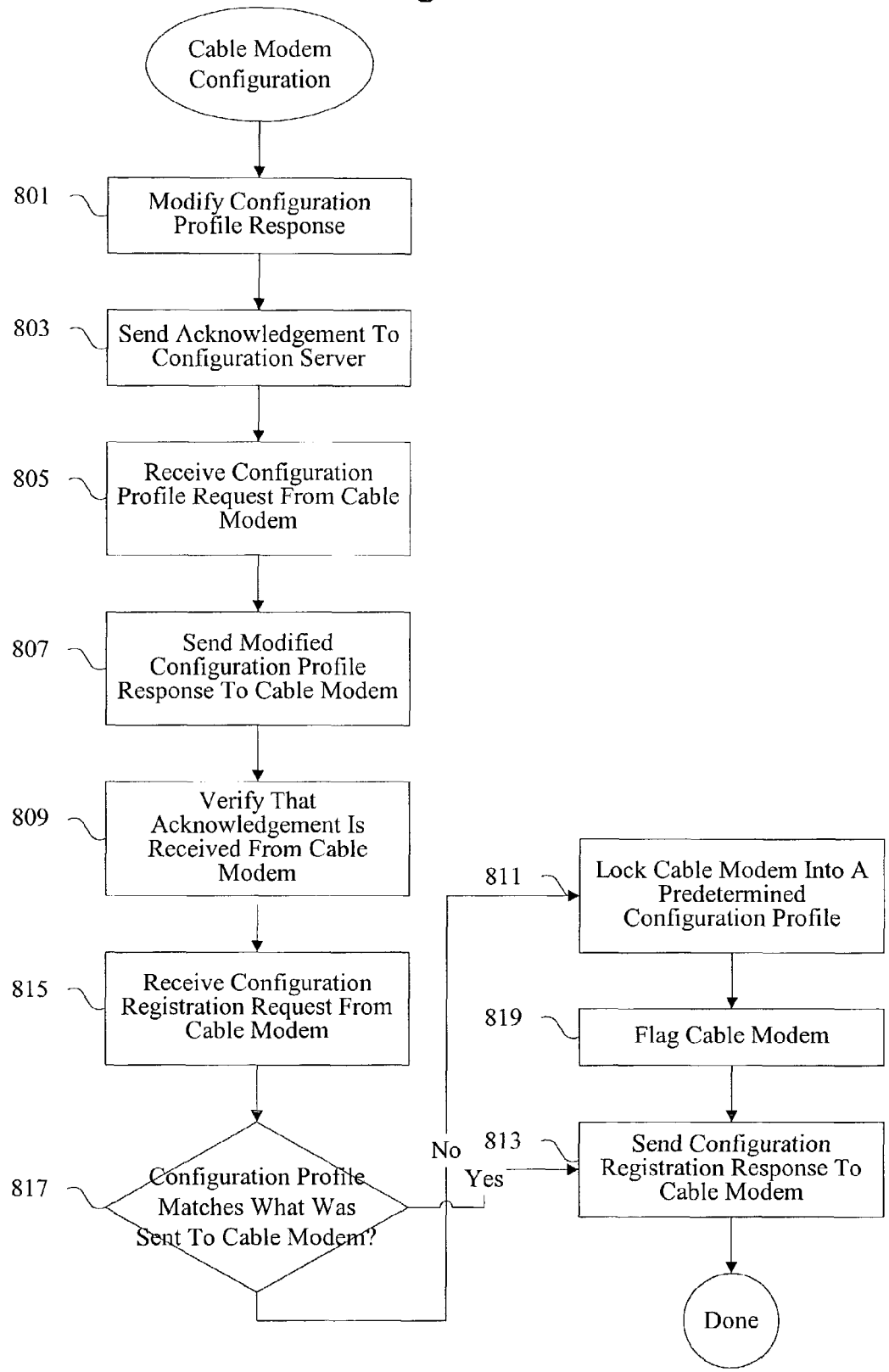
FIG. 8 is a process flow diagram showing additional operations at a head end.

FIG. 8 is a flow process diagram showing one example of cable modem configuration continued from FIG. 7. According to various embodiments, the head end modifies the configuration profile response at 801 to include a modified configuration profile and/or a modified authentication value. An acknowledgment is sent to the configuration server at 803. At 805, a configuration profile request is received from the cable modem. At this point, the head end is operating as a configuration server. The head end operating as the configuration server sends a modified configuration profile response to the cable modem at 807. According to various embodiments, the head end verifies that an acknowledgement is received from the cable modem at 809. At 815, the head end receives a configuration registration request from the cable modem. At 817, the head end determines if the configuration profile received from the cable modem matches the profile sent to the cable modem. If the profile matches, the configuration registration response is sent to the cable modem 813. In the configuration profile does not match, the cable modem is locked into a predetermined configuration profile at 811. The cable modem is then flagged 819 before a configuration registration response is sent to the cable modem at 813.

The present invention for allowing enhanced features and security during cable modem configuration can be implemented in a variety of communication devices. In one example, the techniques can be implemented in a cable modem coupled to a cable network head end. In various embodiments, this is implemented in high bandwidth networks such as a cable network or a satellite network. In the context of a cable network, the invention can be implemented in a cable network head end or in a line card of a cable network head end such as the Cisco UBR 7200 available from Cisco Systems, Inc or San Jose, Calif.

Figure 9:
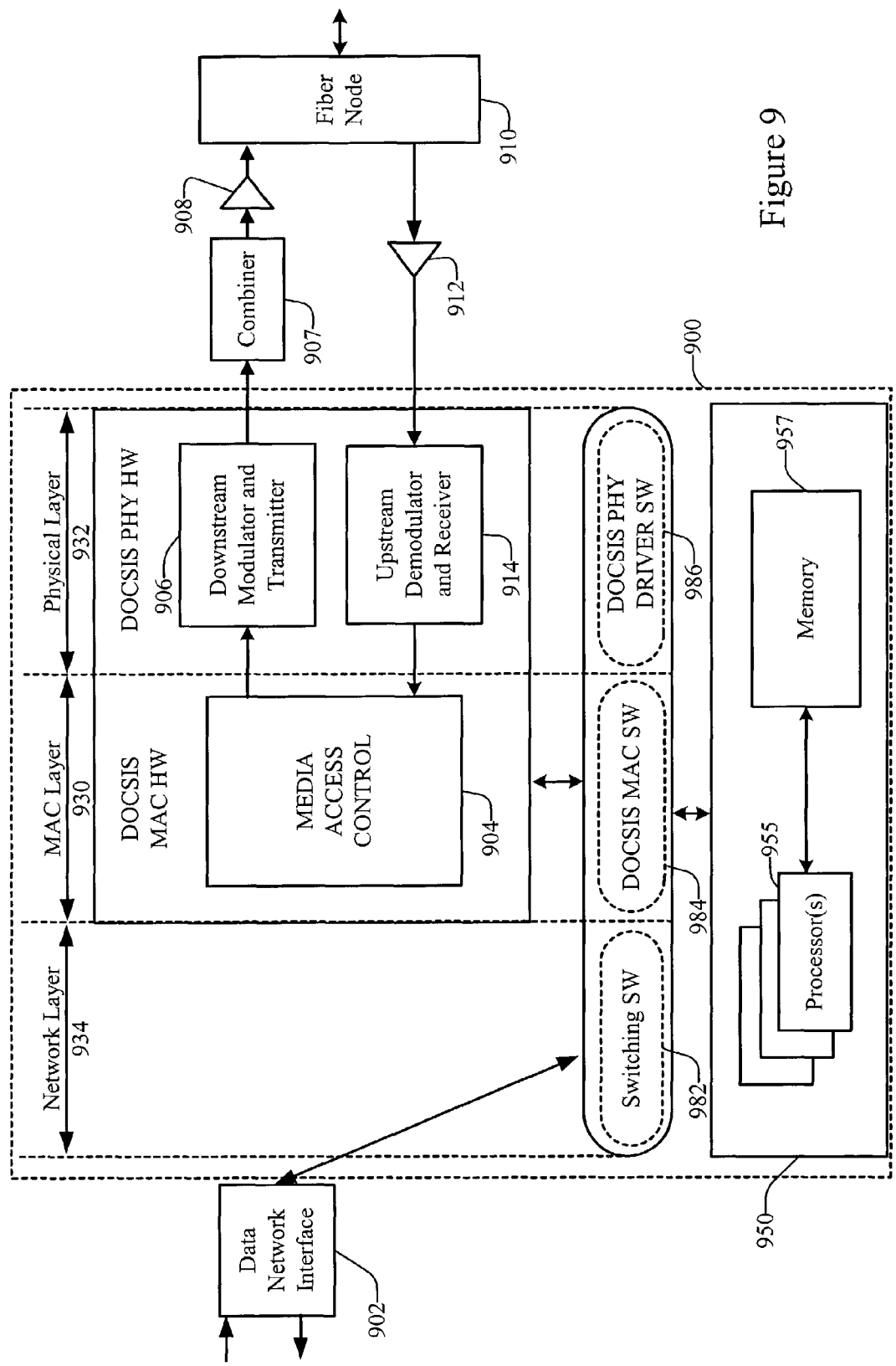
FIG. 9 is a diagrammatic representation of a cable modem head end that can be used with the techniques of the present invention.

FIG. 9 depicts the basic components of a cable modem head end that can be coupled with a cable modem. A Data Network Interface 902 is an interface component between an external data source and the cable system. External data sources transmit data to data network interface 902 via optical fiber, microwave link, satellite link, or through various other media. Also as mentioned above, a Media Access Control Block (MAC Block) 904 receives data packets from a Data Network Interface 902 and encapsulates them with a MAC header.

In a specific embodiment as shown in FIG. 9, CMTS 900 provides functions on three network layers including a physical layer 932, a Media Access Control (MAC) layer 930, and a network layer 934. Generally, the physical layer is responsible for receiving and transmitting RF signals on the cable plant. Hardware portions of the physical layer include a downstream modulator and transmitter 906 and an upstream demodulator and receiver 914. The physical layer also includes software 986 for driving the hardware components of the physical layer.

Once an information packet is demodulated by the demodulator/receiver 914, it is then passed to MAC layer 930. A primary purpose of MAC layer 930 is to encapsulate and decapsulate packets within a MAC header, preferably according to the above-mentioned DOCSIS standard for transmission of data or other information.

MAC layer 930 includes a MAC hardware portion 904 and a MAC software portion 984, which function together to encapsulate information packets with the appropriate MAC address of the cable modem(s) on the system. After the upstream information has been processed by MAC layer 930, it is then passed to network layer 934. Network layer 934 includes switching software 982 for causing the upstream information packet to be switched to an appropriate data network interface on data network interface 902.

When a packet is received at the data network interface 902 from an external source, the switching software within network layer 934 passes the packet to MAC layer 930. MAC block 904 transmits information via a one-way communication medium to downstream modulator and transmitter 906. Downstream modulator and transmitter 906 takes the data (or other information) in a packet structure and converts it to modulated downstream frames, such as MPEG or ATM frames, on the downstream carrier using, for example, QAM 64 modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 907. Converter 908 converts the modulated RF electrical signals to optical signals that can be received and transmitted by a Fiber Node 910 to the cable modem hub.

It is to be noted that alternate embodiments of the CMTS (not shown) may not include network layer 934. In such embodiments, a CMTS device may include only a physical layer and a MAC layer, which are responsible for modifying a packet according to the appropriate standard for transmission of information over a cable modem network. The network layer 934 of these alternate embodiments of CMTS devices may be included, for example, as part of a conventional router for a packet-switched network.

In a specific embodiment, the network layer of the CMTS is configured as a cable line card coupled to a standard router that includes the physical layer 932 and MAC layer 930. Using this type of configuration, the CMTS is able to send and/or receive IP packets to and from the data network interface 902 using switching software block 982. The data network interface 902 is an interface component between external data sources and the cable system. The external data sources transmit data to the data network interface 902 via, for example, optical fiber, microwave link, satellite link, or through various media. The data network interface includes hardware and software for interfacing to various networks such as, for example, Ethernet, ATM, frame relay, etc.

As shown in FIG. 9, the CMTS includes a hardware block 950 including one or more processors 955 and memory 957. These hardware components interact with software and other hardware portions of the various layers within the CMTS. Memory 957 may include, for example, I/O memory (e.g. buffers), program memory, shared memory, etc. Hardware block 950 may physically reside with the other CMTS components.

Because such information and program instructions may be employed to implement the systems/methods described herein, the present invention relates to machine readable media that include program instructions, state information, etc. for performing various operations described herein. Machine readable media may contain instructions for programming tuner characteristics onto a nonvolatile memory. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Aspects of the invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. For example, the head end has a variety of embodiments, which include a cable modem termination system coupled to a router or a multicast router. A cable modem can also be a separate entity or entirely integrated into a client system. Therefore, the scope of the invention should be determined with reference to the appended claims.

What is claimed is:

1. A method for configuring a cable modem, the method comprising:

receiving a configuration server address request from a cable modem;

forwarding the configuration server address request from the cable modem to an address server;

receiving a configuration server address offer from the address server, wherein the configuration server address offer includes the address of a configuration server;

replacing the address of the configuration server with the address of the head end at the head end, wherein the address is replaced in the configuration server address offer received from the address server;

forwarding the modified configuration server address offer to the cable modem, wherein the modified configuration server address offer configures the cable modem to send a quality of service profile request to the head end instead of to the configuration server;

sending a configuration profile request to the configuration server on behalf of the cable modem;

receiving a configuration profile reply from the configuration server, wherein the configuration profile reply includes a configuration profile and authentication information;

verifying that the authentication information is valid.

2. The method of claim 1, further comprising:

sending an acknowledge to the configuration server after receiving the configuration profile reply.

3. The method of claim 1, wherein the configuration profile includes quality of service information.

4. The method of claim 3, wherein the configuration server is a TFTP server.

5. The method of claim 4, wherein the address server is a DHCP server.

6. The method of claim 5, wherein the configuration profile reply includes a DOCSIS configuration file.

7. The method of claim 6, wherein the authentication information is an MD5 hash sequence.

8. A cable modem head end, comprising:

a first interface coupled to a plurality of cable modems, the first interface configured to receive a configuration server address request from a cable modem;

a second interface coupled to an address server, the second interface configured to forward the configuration server address request from the cable modem to the address server and receive a configuration server address offer from the address server, wherein the configuration server address offer includes the address of a configuration server;

a processor configured to replace the address of the configuration server with the address of the head end;

wherein the first interface is further configured to forward the modified configuration server address offer to the cable modem, wherein the modified configuration server address offer configures the cable modem to send a quality of service profile request to the head end instead of to the configuration server;

wherein the second interface is further configured to send a configuration profile request to the configuration server on behalf of the cable modem and receive a configuration profile reply from the configuration server, wherein the configuration profile reply includes a configuration profile and authentication information; and wherein the processor is further configured to verify that the authentication information is valid.

9. A cable modem head end, comprising: means for receiving a configuration server address request from a cable modem;

means for forwarding the configuration server address request from the cable modem to an address server;

means for receiving a configuration server address offer from the address server, wherein the configuration server address offer includes the address of a configuration server;

means for replacing the address of the configuration server with the address of the head end;

means for forwarding the modified configuration server address offer to the cable modem, wherein the modified configuration server address offer configures the cable modem to send a quality of service profile request to the head end instead of to the configuration server;

means for sending a configuration profile request to the configuration server on behalf of the cable modem;

means for receiving a configuration profile reply from the configuration server, wherein the configuration profile reply includes a configuration profile and authentication information; and means for verifying that the authentication information is valid.

10. A computer readable storage medium comprising computer code for configuring a cable modem, the computer readable storage medium comprising:

computer code for receiving a configuration server address request from a cable modem; computer code for forwarding the configuration server address request from the cable modem to an address server;

computer code for receiving a configuration server address offer from the address server, wherein the configuration server address offer includes the address of a configuration server;

computer code for replacing the address of the configuration server with the address of the head end at the head end, wherein the address is replaced in the configuration server address offer received from the address server;

computer code for forwarding the modified configuration server address offer to the cable modem, wherein the modified configuration server address offer configures the cable modem to send a quality of service profile request to the head end instead of to the configuration server;

computer code for sending a configuration profile request to the configuration server on behalf of the cable modem;

computer code for receiving a configuration profile reply from the configuration server, wherein the configuration profile reply includes a configuration profile and authentication information;

computer code for verifying that the authentication information is valid.

* * * * *